US011045724B2

(12) United States Patent
Glenn, II et al.

(10) Patent No.: US 11,045,724 B2
(45) Date of Patent: Jun. 29, 2021

(54) GAMING MACHINE WITH FLOATING MID-SCREEN INPUT DECK

(71) Applicant: SG Gaming, Inc., Las Vegas, NV (US)

(72) Inventors: Robert James Glenn, II, Chicago, IL (US); Christian Louis Castro, Verona, WI (US); Paul Michael Lesley, Chicago, IL (US)

(73) Assignee: SG Gaming, Inc., Las Vegas, NV (US)

( * ) Notice: Subject to any disclaimer, the term of this patent is extended or adjusted under 35 U.S.C. 154(b) by 95 days.

(21) Appl. No.: 16/046,556

(22) Filed: Jul. 26, 2018

(65) Prior Publication Data

US 2019/0046872 A1 Feb. 14, 2019

Related U.S. Application Data (60) Provisional application No. 62/543,524, filed on Aug. 10, 2017.

(51) Int. Cl.
*A63F 13/25* (2014.01)
*G07F 17/32* (2006.01)
*A63F 13/90* (2014.01)

(52) U.S. Cl.
CPC .............. *A63F 13/25* (2014.09); *G07F 17/32* (2013.01); *A63F 13/90* (2014.09)

(58) Field of Classification Search
CPC .. G07F 17/32; G07F 17/3202; G07F 17/3204; G07F 17/3211; G07F 17/3216; G07F 17/3223; A63F 13/25; A63F 13/90
See application file for complete search history.

(56) References Cited

U.S. PATENT DOCUMENTS

| | | | |
|---|---|---|---|
| 6,254,481 B1* | 7/2001 | Jaffe | A63F 13/10 463/20 |
| D730,993 S | 6/2015 | Castro et al. | |
| 9,349,240 B2 | 5/2016 | Castro et al. | |
| D760,846 S | 7/2016 | Castro et al. | |
| 9,858,747 B2 | 1/2018 | Castro et al. | |
| 2002/0032553 A1* | 3/2002 | Simpson | A63F 13/08 703/8 |
| 2008/0132333 A1* | 6/2008 | Kogo | G07F 17/3211 463/37 |
| 2010/0120540 A1* | 5/2010 | Hirato | G07F 17/32 463/46 |

(Continued)

OTHER PUBLICATIONS

"NOVOSTAR® V.I.P. II", Product Publication, Novomatic America, 2015, 2 pages (Year: 2015).*

(Continued)

*Primary Examiner* — Jasson H Yoo (57) ABSTRACT

An inventive gaming machine is disclosed that includes a floating, mid-screen input deck positioned facing an active display region. The gaming machine positions the input deck relative to the active display region such that a part of the active display region extends below the input deck. The gaming machine implements a large active display region within a relatively compact envelope. The gaming machine further provides an ergonomically superior gaming machine configuration that enables a player to view the full extent of the active display region while requiring minimal head and eye movements.

20 Claims, 6 Drawing Sheets

(56) References Cited

U.S. PATENT DOCUMENTS

| | | | |
|---|---|---|---|
| 2011/0034239 A1* | 2/2011 | Collette | G07F 17/32 463/26 |
| 2014/0179420 A1* | 6/2014 | Gawel | G07F 17/3223 463/29 |
| 2017/0024956 A1 | 1/2017 | Hornik et al. | |
| 2018/0047246 A1 | 2/2018 | Castro et al. | |
| 2018/0047247 A1 | 2/2018 | Castro et al. | |
| 2018/0050273 A1* | 2/2018 | Garoufalis | A63F 13/525 |

OTHER PUBLICATIONS

"Newspace Invaders Arcade Gets Us in a Frenzy!", by Hey PoorPlayer Nov. 23, 2016, tagged site (for date) https://www.heypoorplayer.com/tag/space-invaders/, Article site; https://www.heypoorplayer.com/2016/11/23/space-invaders-frenzy/ (Year: 2016).*

"Novostar® V.I.P. II", Product Publication, Novomatic America, 2015, 2 pages.

* cited by examiner

GAMING MACHINE WITH FLOATING MID-SCREEN INPUT DECK

CROSS-REFERENCE TO RELATED APPLICATIONS

This application claims the benefit of U.S. Provisional Patent Application 62/543,524, filed on 10 Aug. 2017, which is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2017, Bally Gaming, Inc.

FIELD OF THE INVENTION

The present invention relates generally to gaming systems, apparatus, and methods of presenting games, and, more particularly, to the design and configuration of gaming system cabinets and innovative player-positioning with respect to input devices and display devices.

BACKGROUND OF THE INVENTION

The gaming industry is always on the lookout for gaming apparatus that presents unconventional and exciting environments for players. In particular, gaming establishments endeavor to present striking game machine landscapes that capture the attention of players when viewed on the casino floor. Some manufacturers seek attention with larger and louder machines—more lights, bigger speakers, brighter colors, etc. This kind of embellishment may be self-limiting, since only so much light, size, and sound can be tolerated by humans. Another, more subtle, approach is to create gaming machines that have a unique appearance that captures the eye due to its distinctiveness. Further, players tend to embrace gaming machine that create an engaging and comfortable game play space, referring to the environment inhabited by a player at a particular gaming machine.

Game machine design, in particular design factors related to the shape and feel of the player-space, is ripe for innovative approaches and inventive implementations related to a player's visual, tactile, and environmental experience within the bubble created by the gaming machine.

SUMMARY OF THE INVENTION

According to one aspect of the present invention, a gaming machine includes an active display region facing a player viewing position. The active display region has an upper boundary and a lower boundary. The gaming machine further includes an input deck spaced apart from the active display region and imposed between the player viewing position and the active display region. The input deck includes an edge proximal to the active display region that intersects an imaginary horizontal plane disposed between the upper and lower boundaries of the active display region. The input deck is configured to receive inputs from a player at the player viewing position and the active display region subtends an angle of at least fifteen degrees from the horizontal plane to the lower boundary when measured through a vertex at the intersection of the edge and the imaginary horizontal plane.

According to another aspect of the invention, a gaming machine includes an active display region with an upper boundary and a lower boundary. The active display region faces a player viewing position. The gaming machine further includes an input deck spaced apart from the active display region and facing the active display region. The input deck is configured to receive inputs from a player at the player viewing position and has an edge proximal to the active display region that intersects an imaginary horizontal plane disposed between the upper and lower boundaries of the active display region. At least fifteen percent of the active display region extends below the imaginary horizontal plane.

According to still another aspect of the invention, a method of configuring a gaming machine for play of a wagering game includes providing an active display region with an upper boundary and a lower boundary. The active display region indicates a range of player viewing positions facing the active display region. The method further includes providing an input deck spaced apart from the active display region and between the active display region and the range of player viewing positions. The input deck is configured to receive inputs from a player within the range of player viewing positions and the input deck has an edge proximal to the active display region that intersects an imaginary horizontal plane disposed between the upper and lower boundaries of the active display region. At least fifteen percent of the active display region extends below the imaginary horizontal line. The method further includes presenting visual content on the active display region and receiving inputs associated with the visual content at the input deck from a player within the range of player viewing positions.

Additional aspects of the invention will be apparent to those of ordinary skill in the art in view of the detailed description of various embodiments, which is made with reference to the drawings, a brief description of which is provided below.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill.

Figure 1:
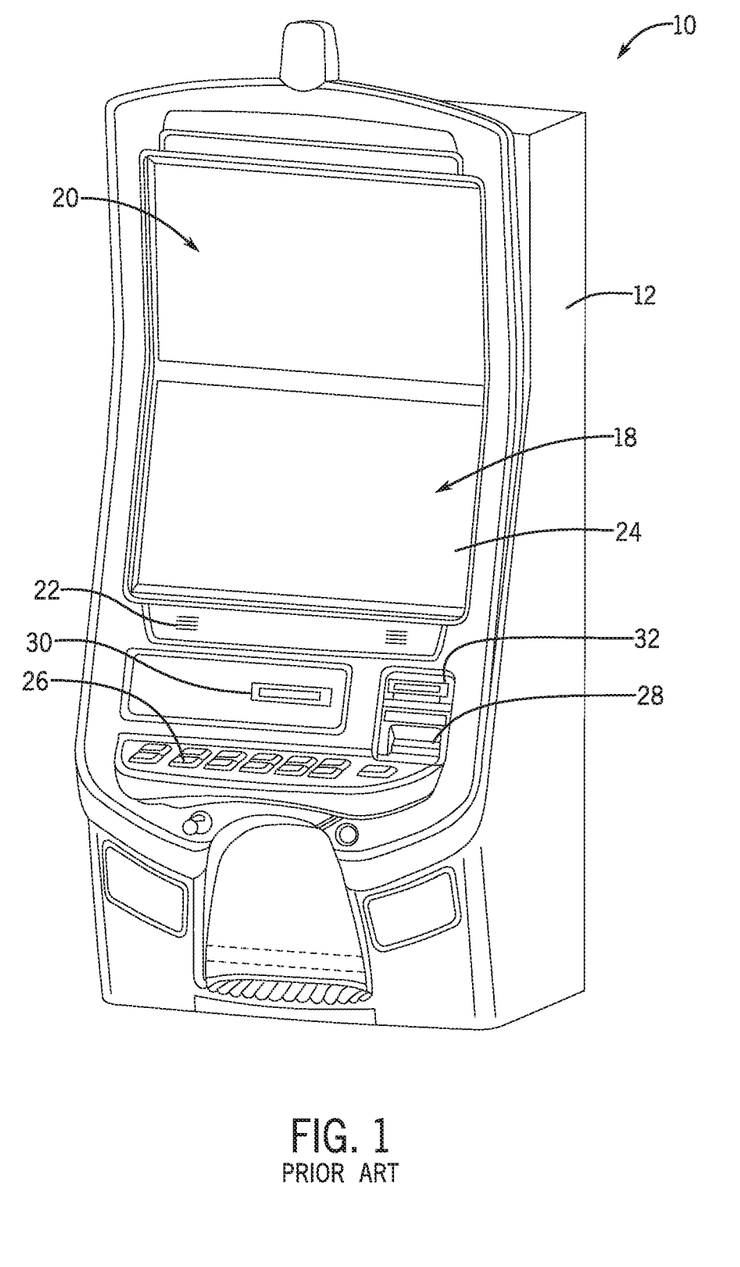
FIG. 1 is a perspective view of a prior art gaming machine.

Referring to FIG. 1, there is shown a prior art gaming machine 10 similar to those currently operated in gaming establishments, such as casinos. In some aspects, the gaming machine 10 may be an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057, 303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The general configuration of the gaming cabinet 12 defines the typical component layout of many prior art gaming machines. For example, the gaming cabinet 12 defines a player position facing the one or more display devices 18, 20. The player position is further defined by a player input region disposed generally below the display devices 18, 20. The input region includes various input and output devices (e.g., 22, 26, 28, 30, and 32, further defined later in this paper).

The input devices, output devices, and input/output devices are disposed on, and securely coupled to, the cabinet 12. By way of example, the output devices include a primary display device 18, a secondary display device 20, and one or more audio speakers 22. The primary display device 18 or the secondary display device 20 may be a mechanical-reel display device, a video display device, or a combination thereof in which a transmissive video display device is disposed in front of the mechanical-reel display device to portray a video image superimposed upon the mechanical-reel display device. The display devices variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary display devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device (also called a free-space sensing input device), a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on the gaming machine. The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance stored on the gaming machine, the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

The prior art gaming machine 10, illustrated in FIG. 1, presents a number of undesirable challenges to both the player and the gaming establishment. For one thing, its conventional appearance fails to distinguish it from many other gaming machines found on a casino floor. With casinos having upwards of 1000 gaming machines on the floor, it is increasingly difficult to make a gaming machine stand out from the crowd, and many prior art gaming machines display a design configuration that's been familiar to players for decades. While exciting and engaging game content may hold a player at a machine once they begin playing, regardless of the appearance of the particular machine, astute game machine manufacturers understand that a gaming machine's visual appearance is one of the factors that draw a player to play a game in the first place. When gaming machines all look alike to some degree, there is little reason for a player to choose one machine over another.

From the player's perspective, the conventional gaming machine configuration is problematic. The viewing position imposed by the gaming machine 10 positions the primary and secondary display devices 18, 20 (which make up the "active display" of the gaming machine 10) above the various input devices 26, 28, 30, 32. Assuming the player prefers a posture while playing with their hands in position to access the buttons 26 and/or the touchscreen 24, the primary screen 18 is substantially opposite the player's normal line of sight. This design was adequate when game machine displays were limited to relatively small CRT screens. However, in order to view the full screens of both the primary and secondary display devices 18, 20, that is, in order to see the active displays from top to bottom, the player may have to tilt their head back considerably from a relaxed, at-rest position. If a taller active display were to be incorporated in the conventional gaming machine 10, the extra screen size could only extend further upward, requiring even more neck rotation—diverging even more from a comfortable and sustainable posture.

The inventive gaming machine described herein seeks to resolve these issues and to enhance the player's physical and emotional experience while engaged in game play.

Inventive Gaming Machine

Figure 2:
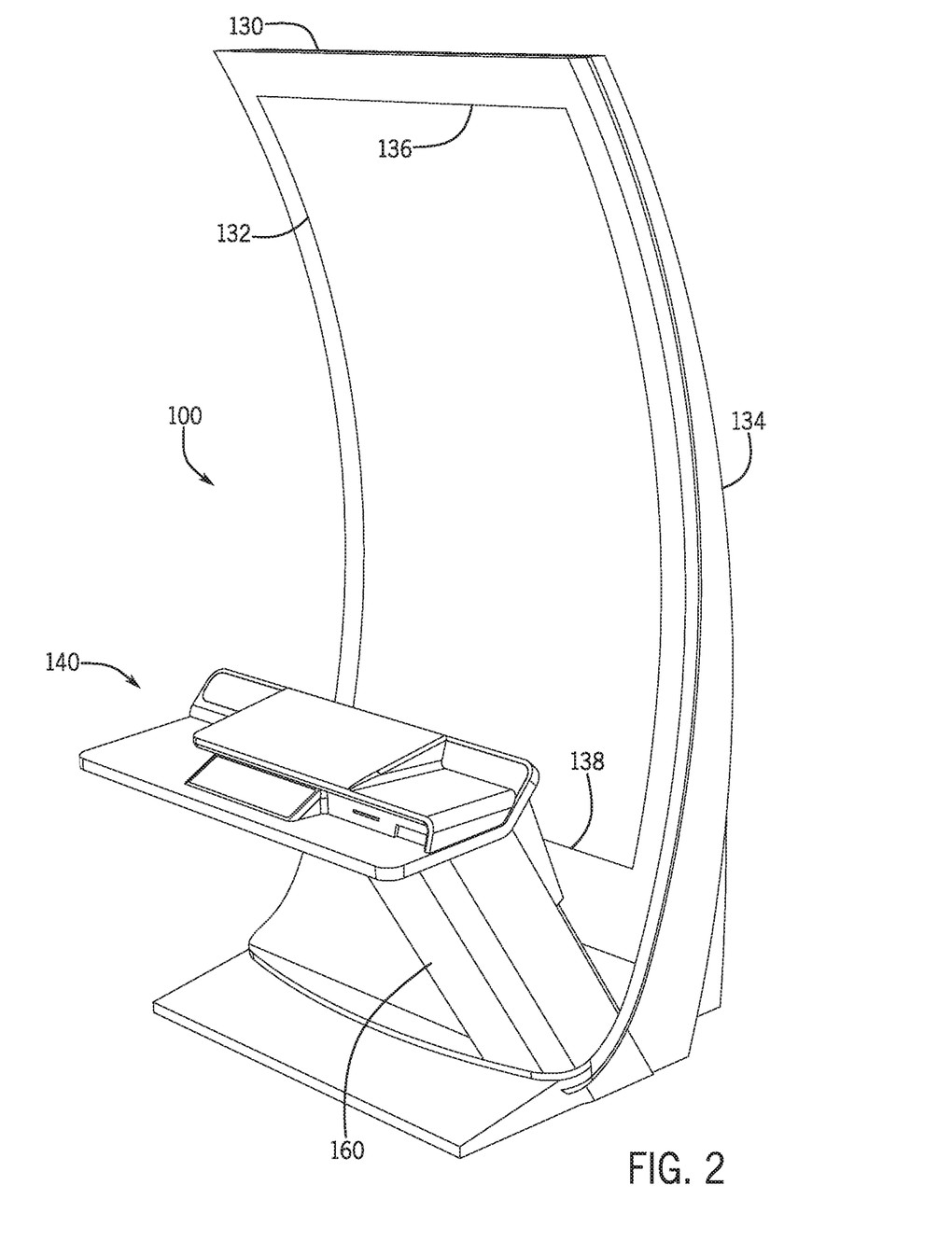
FIG. 2 is a perspective view of a gaming machine according to an embodiment of the present invention.

Referring to FIG. 2, there is shown a gaming machine 100 according to an embodiment of the invention. The gaming machine 100 is configured for use in many of the same venues as the prior art gaming machine 10, however, the gaming machine 100 presents a unique, striking appearance and ergonomic design that attracts players to the gaming machine and also enhances the functionality of the various electronic devices implemented for game play.

Immediately noticeable are the relative positions of the active display region 132 (as provided by the display device 130) and the player input deck 140. In an embodiment of the gaming machine 100, the input deck 140 is disposed medial to an upper boundary 136 and a lower boundary 138 of the active display region 132. Additionally, the input deck 140 is unmistakably separate and spaced apart from the active display region 132. From a player's point of view, the input deck 140 appears to "float" in front of the active display region 132. This effect is enhanced by mounting the input deck 140 on a single, side-offset pedestal 160 extending from the gaming machine housing 134. The floating input deck is visually striking in comparison to the prior art gaming machines. Also, the floating input deck enables better utilization of a type of large display screen that is becoming more popular as the cost of display devices decreases due to improved manufacturing techniques and large volume discounts.

In the embodiment shown in FIG. 2, the display device comprises a 75 inch (diagonal) curved screen with a 16:9 aspect ratio. Similar benefits may be realized with smaller and larger screens. Screen size in an embodiment is preferably between 65 and 85 inches, and even more preferably between 70 and 80 inches, based on currently available (and available in the immediate future. As shown in FIG. 2, even utilizing these large screen sizes, the overall height is on par with many conventional gaming machines having much smaller screens. Similar relative compactness may be realized with a display device having an 86 inch flat screen with a 16:9 aspect ratio, or even a 98 inch flat screen.

The embodiment shown in FIG. 2 includes a display device 130 with a curved screen with a continuous radius. It must be noted that this display device configuration may vary significantly from one embodiment to another. For example, a display device with a flat screen may be implemented in the invention and still be faithful to the overall intent and spirit of the invention. Similarly, a display device may be irregularly curved (e.g., have an asymmetric curvature and/or a varying radius of curvature). Alternatively, the display device may comprise a plurality of separate devices. The plurality of devices may be utilized to produce a faceted approximation of a curved screen.

Figure 6:
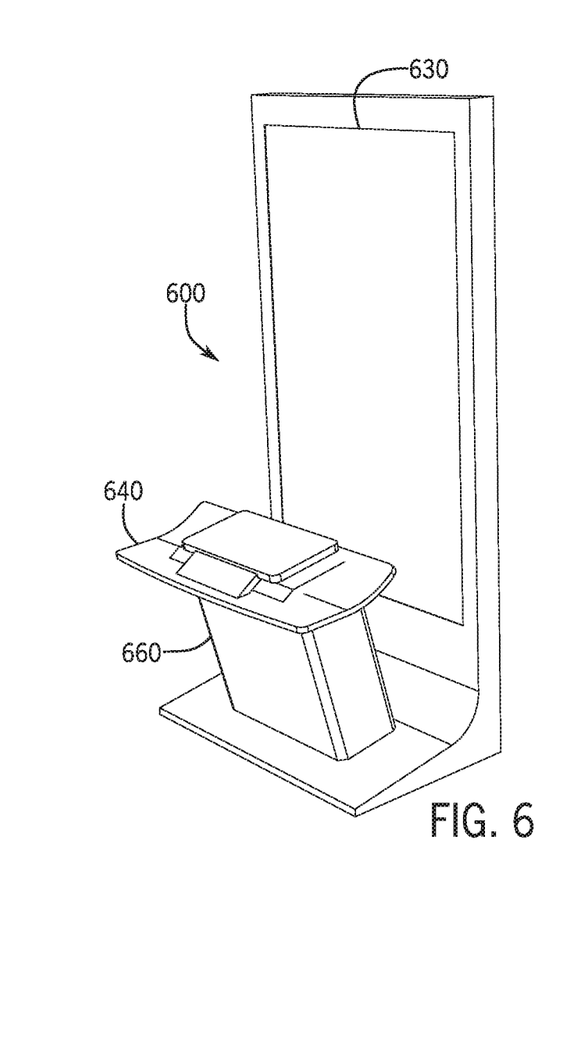
FIG. 6 is a perspective view of a gaming machine according to another embodiment of the present invention.
Figure 7:
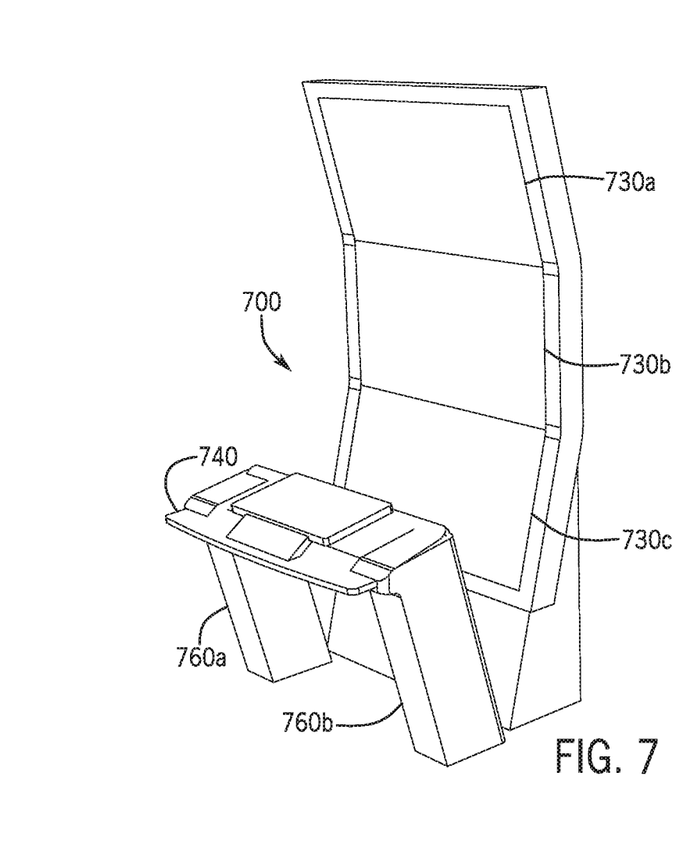
FIG. 7 is a perspective view of a gaming machine according to still another embodiment of the invention.

FIGS. 6 and 7 illustrate some additional embodiments of the inventive gaming machine. These embodiments and others represented in this disclosure are not intended to be limiting and are presented as examples only of the various configurations and combinations thereof that are considered within the scope and spirit of the invention.

FIG. 6 shows an embodiment 600 of the invention that includes a flat-screen display device 630 and a single, centrally positioned pedestal 660 supporting the input deck 640.

FIG. 7 shows an embodiment 700 of the invention that includes a faceted display assembly comprising separate display device 730a, 730b, and 730c, or a single display device with three regions 730a, 730b, and 730c. In addition, embodiment 700 includes a split-pedestal 760a, 760b, supporting the input deck 740.

Referring again to FIG. 2, the player viewing position suggested by the gaming machine 100 necessarily faces the active display region 132 so that the player experiences the game images displayed on the display device 130. The mid-screen positioning of the input deck 140 ensures that the active display region 132 is more evenly distributed across the overall height of the housing 134 than are the display devices 18, 20 of the conventional gaming machine 10. The active display region 132 seems to envelop the player viewing position. Structurally, this particular aspect enables the gaming machine 100 to implement a very large active display region yet avoid excessive overall height that may cause assembly complications and/or infringe upon available space constraints.

The position of the input deck 140 relative to the active display region 132 may further constrain the player viewing position because a player may need to interact with various devices of the input deck when initiating, playing, or cashing out of a game presented on the gaming machine 100. An optimal position for the input deck 140 allows easy and comfortable accessibility to the input, output, and input/output devices employed to play a game, and provides full visibility of the active display region 132.

The positioning of the input deck 140, and the configuration of the various devices associated with the input deck, reflect some well-understood ergonomic concepts related to comfortable and efficient head/hand/arm positions. Many of these concepts were developed to facilitate the configuration of an office workspace including keyboards, monitors (display devices), and pointing devices such as a mouse or rollerball, and are intended to enable a worker to interact with such devices over time while minimizing fatigue, physical stress, and repetitive motion injury. These concepts lend themselves easily to the configuration of the elements of a gaming machine so that a player can operate the machine and interact with the game in comfort.

Additionally, the configuration of the gaming machine 100, including the active display region extending both above and below the input deck, provides enhanced visibility of the whole expanse of the display region to a player positioned at the input deck. Similar ergonomic concepts as those employed in the design and disposition of the input deck are reflected in the dimensions and placement of the active display region with respect to the input deck. The dimensions and positioning are intended to ensure the player's maximum engagement with the game while minimizing any physical strain, fatigue, or distraction.

Referring now to some of the ergonomic considerations that contribute to the design of the gaming machine 100, it is recognized that a player engaged in the game presented on the gaming machine may need to provide inputs and other interactions that initiate and perpetuate the game itself. For example, a wager input (e.g., pushing a SPIN button) may be required to initiate the game, or a monetary transaction may necessarily precede the actual wager input in order to establish a credit balance from which the wager is drawn. These inputs, and others, are accomplished using one or more devices provided on or near the input deck, such as a mechanical SPIN button, a virtual touchscreen button, and a value input device such as a bill validator. Using these devices inherently positions the player in front of the input deck, and this would be the case whether the gaming machine 140 is configured for a standing player or a player sitting on a chair or stool. The input deck is positioned to provide an ergonomically satisfactory hand/arm position relative to the standing/sitting player while they play a game on the gaming machine 100. In keeping with general ergonomic principles, the input deck 140 (and the input devices thereon) is positioned at a height that allows the player's elbows to be bent about 90 degrees and their wrists to be in a generally neutral position.

Referring to the active display region, and in particular to the relative positions of the active display region and the input deck, the active display region faces the input deck and, therefore, the player positioned at the input deck. To maximize the player's integration into the environment of the gaming machine, the display region extends both above and below the input deck. This enables the player at the input deck to visually engage with the entire display region without requiring excessive head movement to scan the display region from top to bottom. Additionally, the player feels like they are centrally located in the game environment with the active display region spread out before them more like they see the world and less like they are watching a TV screen. In comparison to the conventional gaming machine 10, extending the active display region both above and below the input deck places a large amount of the active display region within the player's normal range of sight, including a reasonable amount of eye rotation and requiring minimal head and neck movement.

Defining the Range of Player Positions

It is helpful to incorporate some ergonomic considerations into the design and layout of a gaming machine. For example, the relative positions of the active display region and the input deck have a great effect on the range of viable player viewing positions. Since these two elements are both necessary for play of the game (i.e., the player needs to see the game images on the display device and needs to interact with the various input and output devices on the input deck), their locations will inherently determine the optimal player position for game-play. Additionally, the gaming machine should encourage the player to assume a comfortable, relaxed posture within the player viewing position, so that the player may engage with the machine for an extended period without experiencing physical discomfort. The invention described herein includes features that are directed to attaining these goals.

Figure 3:
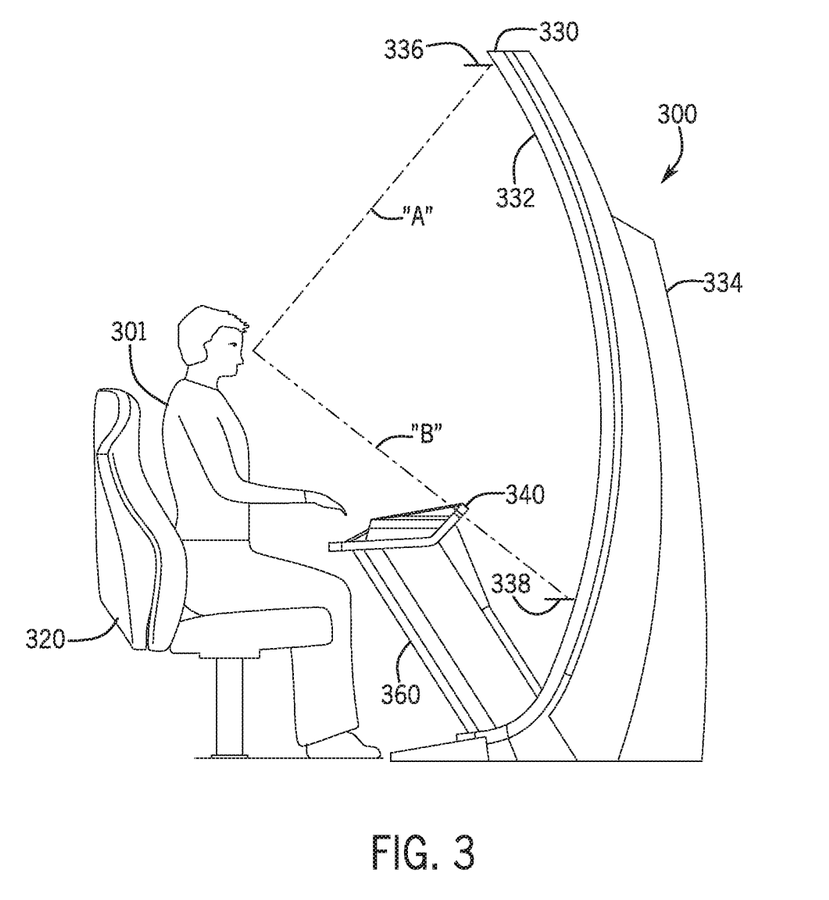
FIG. 3 is side view of a seated-position gaming machine according to an embodiment of the present invention.

Referring now to FIG. 3, a seated-player embodiment of the invention is shown in side view to illustrate some of the benefits reaped from the unique floating, mid-screen input deck configuration implemented by the invention. The gaming machine 300 includes an active display region 332 defined by the display device 330. The display device 330 is housed and supported by a display housing 334. Spaced apart from the active display region 332, and disposed between an upper boundary 336 and a lower boundary 338 of the active display region 332, an input deck 340 provides various devices used for playing a game on the gaming machine 300. To facilitate the "floating" visual aspect, the input deck 340 is supported by a pedestal 360.

Player 301 is seated in a chair 320 proximal to the input deck 340, within the range of player viewing positions suggested by the input deck 340 and the active display region 332. In the figure, the sightlines A and B are indicative of the extents of the active display region 332 and illustrate the visual accessibility of the large screen by a player comfortably seated at the input deck 340. The configuration of gaming machine 330 is not limited to a particular "average" or exemplary player (i.e., a particular height, etc.) but is designed to accommodate a range of players of different sizes that might reasonably be expected to employ the gaming machine 330. As shown in FIG. 3, the range between A and B limits the amount of eye and head rotation needed to capture the entire display region. This range is designed to be within the limits of comfort and convenience while providing maximum visual scope.

Figure 4:
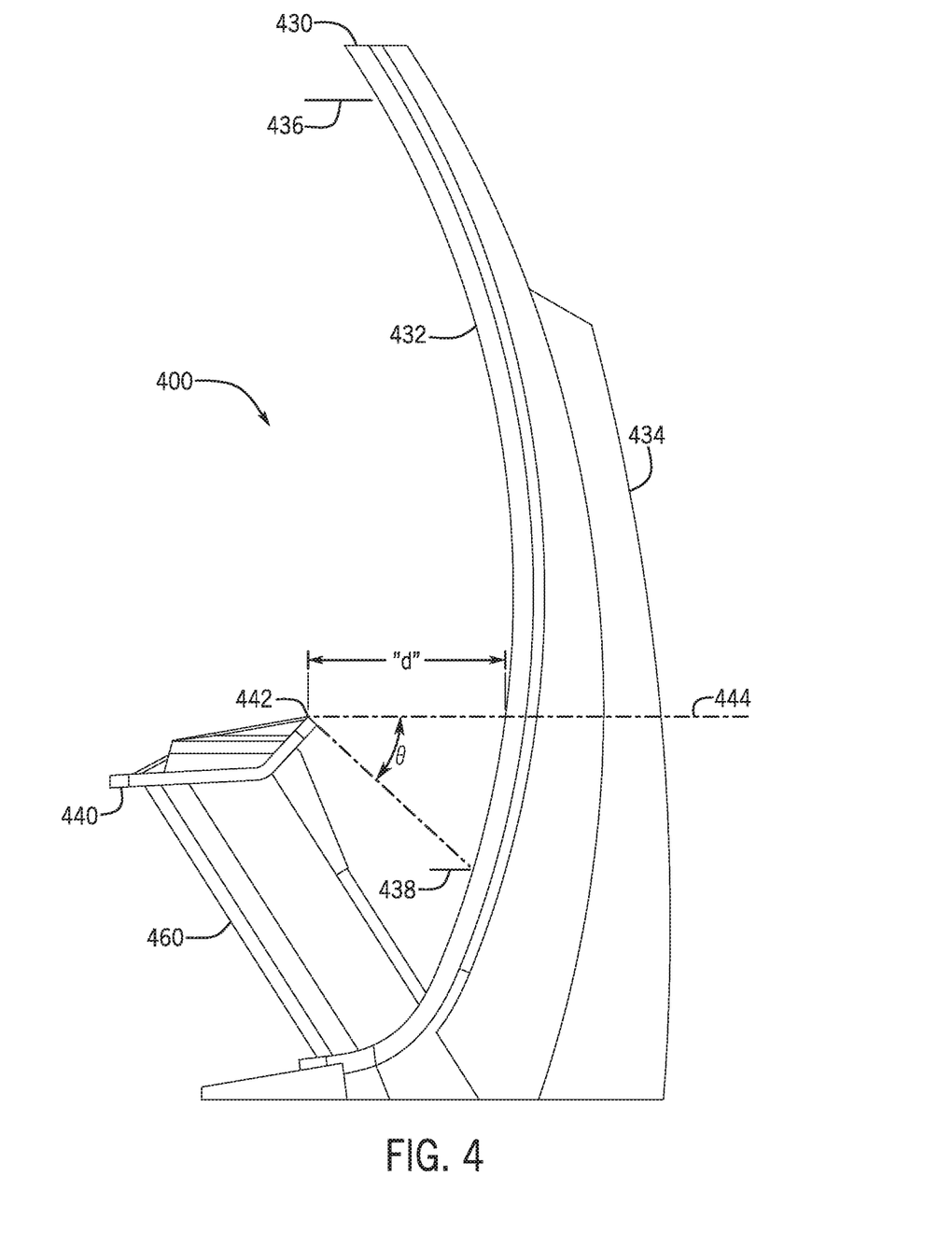
FIG. 4 is side view of another gaming machine according to an embodiment of the present invention.

Referring now to FIG. 4, shown is a side view of another embodiment of the invention. The gaming machine 400 includes similar components as other embodiments discussed previously, including an active display region 432 defined by the display device 430. The active display region has an upper boundary 436 and a lower boundary 438 that demarcate the vertical extent of the active display region 432.

Also, the gaming machine 400 includes an input deck 440 supported by a pedestal 460 extending from the display housing 434. Input deck 440 includes an edge 442 proximal to the active display region 432. The edge 442 intersects an imaginary horizontal plane 444 that also intersects the active display region 432 between the upper and lower boundaries. The active display region extends below the horizontal plane 444 to take full advantage of the player viewing position as previously described. In an embodiment, the active display region 432 subtends an angle "θ" of at least 15 degrees below the horizontal plane 444 in order to fully capture the range of viewable area by a player in the player viewing position. The 15 degree angle is measured through a vertex at the intersection of the edge 442 and the horizontal plane 444. The subtended angle "θ" is preferably between 25 degrees and 50 degrees, and more preferably between 40 degrees and 45 degrees.

The relative positions of the active display region and the input deck may be alternatively described in terms of a percentage of the active display region below the horizontal plane. In an embodiment, at least fifteen percent (15%) of the active display region 432 extends below the horizontal line 444. The percentage of the active display region below the horizontal plane is preferably between fifteen percent (15%) and thirty percent (30%), and more preferably between fifteen percent (15%) and twenty percent (20%).

The input deck 440 is offset from the active display region (e.g., by the distance "d"), and this offset influences the viewable range A-B. In an embodiment, the distance "d" is at least 12 inches. The distance "d" is preferably between 20 inches and 40 inches, and more preferably between 25 inches and 35 inches.

Input Deck Components

As may be required to present a particular game, a gaming machine 100 may comprise various input devices, output devices, input/output devices, internal electronic/electromechanical components, and wiring. For example, input devices may be provided to enable a player to initiate, select, direct, and/or terminate a game on the gaming machine. Non-limiting example of input devices include mechanical/electromechanical buttons, levers, gesture-detecting devices, and various wired and wireless handheld devices (e.g., wand, hand controller, fishing rod). Some input, output, and input/output devices may be grouped together as transactional devices, that is, devices that facilitate the exchange of currency and/or credits used in wagering games. A transactional input device may be configured to receive currency, a printed ticket, or a credit card used to establish a credit balance on the gaming machine. A transactional output device may deliver currency, a printed ticket, or credits to a credit card or player account card upon cashout from a gaming session. Transactional devices are reasonably expected to be accessible from, if not actually facing, the player-space defined by the gaming machine.

Figure 5:
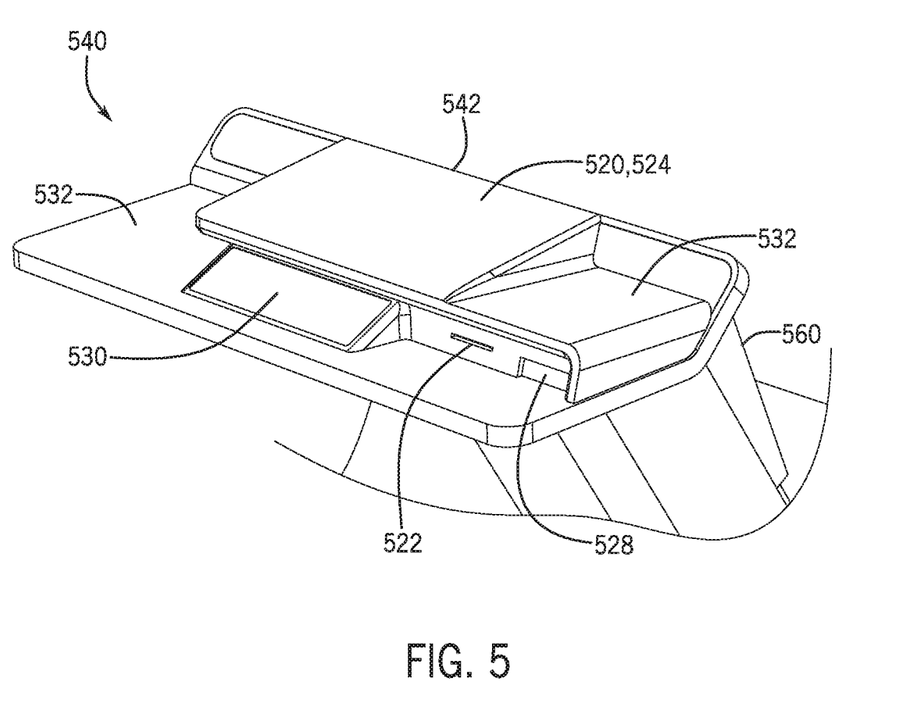
FIG. 5 is a detail view of an exemplary input deck according to an embodiment of the present invention.

The input deck of the invention may include the input, output, and input/output devices described with regard to gaming machine 10, as well as various other devices. For example, as shown in FIG. 5, an exemplary input deck 540 provides an array of devices positioned within easy reach of a player at a player viewing position. While input deck 540 shows one configuration, it is recognized that a wide range of other alternative input decks could be used having materially differing appearances including, but not limited to, input decks with similar elements (520-542) arranged in a different configuration, input decks with a different selection of elements, and/or input decks having a different frame shape.

In an embodiment, a secondary display device 520 is provided on the input deck 540. In some embodiments, a touchscreen 524 may be incorporated in the display device 520 to receive inputs from the player related to various elements of game play at the gaming machine in addition to displaying images and video. Also, a bill/ticket acceptor 528 and a ticket dispenser 522 may be provided on the input deck 540, placed conveniently for comfortable access by the player. A player tracking station 530 may furnish additional devices (e.g., card reader, biometric sensors, key inputs) for accepting/identifying player loyalty account members. Some or all of elements 528, 530, and 522 (some of the abovementioned "transactional devices") may include bulky mechanical or electromechanical elements and may be conveniently housed within the pedestal 560. This disposition of transactional devices within the pedestal may contribute to further diminishing to dimensions of the input deck, enhancing the floating visual presentation of the input deck while maintaining these important devices close at hand for the player's convenience. Flat surfaces 532 can be used as convenient spots to place drinks or other player possessions and may also be utilized to mount mechanical buttons such as a SPIN button.

The relative positioning of the input deck (with its display device) and the active display region provides another benefit for the player. From most locations in the player viewing position, a portion of the secondary display device coincides with the active display region. In other words, part of the secondary display (e.g., the topmost edge 542, typically) actually obscures the player's view of the coincident part of the active display region. In an embodiment, the gaming machine 100 exploits this condition by displaying imagery on the secondary display device that complements the images displayed on the active display region. For example, by displaying similar imagery on both the secondary display device and the active display region, the two displays may blend into each other, effectively erasing the division between the two. This blurring of the dividing lines may be enhanced by synchronizing the displays both temporally and positionally so that images moving across one screen may flow seamlessly onto the other screen. Such effects may further heighten the player's sense of being enveloped by the game machine environment and engaged in the play of the game.

Additionally, an output device may be an audio speaker or other device suitable to emit sounds related to the game. Other peripheral and integral devices may be a part of, or connected to, the gaming machine, such as player accessible ports (e.g., audio output jack for headphones, video headset jack, USB port), secondary or tertiary display devices, wireless transmitters/receivers, etc. It should be understood that numerous other peripheral devices and other elements exist and are readily utilizable in any number of combinations to create various forms of a gaming machine in accord with the present concepts.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A gaming machine comprising:
   an active display region having an upper boundary and a lower boundary, the active display region facing a player viewing position;
   a display housing supporting the active display region;
   a pedestal extending from the display housing;
   an input deck supported by the pedestal and imposed between the player viewing position and the active display region, the input deck spaced apart from the active display region and configured to receive inputs from a player at the player viewing position, the input deck having an edge proximal to the active display region that intersects an imaginary horizontal plane disposed between the upper and lower boundaries of the active display region;
   wherein, the active display region subtends an angle of at least fifteen degrees from the horizontal plane to the lower boundary, measured through a vertex at the intersection of the edge and the imaginary horizontal plane; and
   wherein, the pedestal extends upwards and outwards from the display housing below the active display region at a side offset relative to a horizontal axis defined through a horizontal center of the active display region and a horizontal center of the input deck.

2. The gaming machine of claim 1, wherein the edge is offset by a range of 25 inches to 35 inches from the active display region measured along the imaginary horizontal plane.

3. The gaming machine of claim 1, wherein the input deck includes a secondary display screen, an edge of the secondary display screen obscuring at least a part of the active display region when viewed from the player viewing position.

4. The gaming machine of claim 3, wherein the secondary display screen includes a touchscreen configured to receive manual inputs from the player.

5. The gaming machine of claim 1, wherein the input deck includes one or more mechanical buttons configured to receive manual inputs from the player.

6. The gaming machine of claim 1, wherein the input deck includes a free-space sensing input device configured to receive inputs from the player.

7. The gaming machine of claim 1, wherein the input deck includes sensors configured to detect one or more of eye movement, head movement, eye blinks, or facial expressions.

8. The gaming machine of claim 1 further comprising a second pedestal, wherein the input deck is supported between the pedestal and the second pedestal.

9. A gaming machine comprising:
an active display region having an upper boundary and a lower boundary, the active display region facing a player viewing position;
a display housing supporting the active display region;
a pedestal extending from the display housing;
an input deck supported by the pedestal and spaced apart from the active display region, the input deck being between the player viewing position and the active display region, the input deck configured to receive inputs from a player at the player viewing position, the input deck having an edge proximal to the active display region and intersecting an imaginary horizontal plane disposed between the upper and lower boundaries of the active display region;
wherein at least fifteen percent of the active display region extends below the imaginary horizontal plane; and
wherein the pedestal extends upwards and outwards from the display housing below the active display region at a side offset relative to a horizontal axis defined through a horizontal center of the active display region and a horizontal center of the input deck.

10. The gaming machine of claim 9, wherein the input deck includes a touchscreen input device with a display screen, the display screen obscuring at least a part of the active display region when viewed by a player in the player viewing position.

11. The gaming machine of claim 9, wherein the input deck is cantilevered off of the pedestal.

12. The gaming machine of claim 9, farther comprising a seat configured to support a player proximal to the input deck.

13. The gaming machine of claim 9 further comprising a second pedestal, wherein the input deck is supported between the pedestal and the second pedestal.

14. A method of configuring a gaming machine for play of a wagering game, the method comprising:
providing an active display region with an upper boundary and a lower boundary, the active display region indicating a range of player viewing positions facing the active display region;
providing a display housing supporting the active display region;
providing a pedestal extending from the display housing;
providing an input deck supported by the pedestal and spaced apart from the active display region, the input deck being between the range of player viewing positions and the active display region, the input deck configured to receive inputs from a player within the range of player viewing positions, the input deck having an edge proximal to the active display region and intersecting a horizontal plane disposed between the upper and lower boundaries, wherein at least fifteen percent of the active display region extends below the horizontal plane, and wherein the pedestal extends upwards and outwards from the display housing below the active display region at a side offset relative to a horizontal axis defined through a horizontal center of the active display region and a horizontal center of the input deck;
presenting visual content on the active display region; and
receiving inputs at the input deck from a player within the range of player viewing positions, the inputs being associated with the visual content presented on the active display region.

15. The method of claim 14, wherein the input deck includes a secondary display device, an edge of the secondary display device obscuring a portion of the active display region when viewed from a player within the range of player positions, and the method further comprising presenting visual content on the secondary display device that merges with the visual content on the active display region.

16. The method of claim 15, wherein a displayed image appears to travel between the active display region and the secondary display region by traversing the edge of the secondary display device.

17. The method of claim 15, wherein the visual content on the secondary display device appears to traverse the edge of the secondary display device and move across the edge to the active display region.

18. The method of claim 15, wherein the secondary display device is positionally adjustable to accommodate the range of player viewing positions.

19. The method of claim 15, wherein visual content displayed on the secondary display device is adjustable to accommodate the range of player viewing positions.

20. The method of claim 14, wherein the gaming machine is configured to accommodate a player standing at the input deck.

* * * * *